Jan. 6, 1942.   H. R. DOWNS   2,269,189
FLUID PUMP
Filed March 20, 1939   3 Sheets-Sheet 2
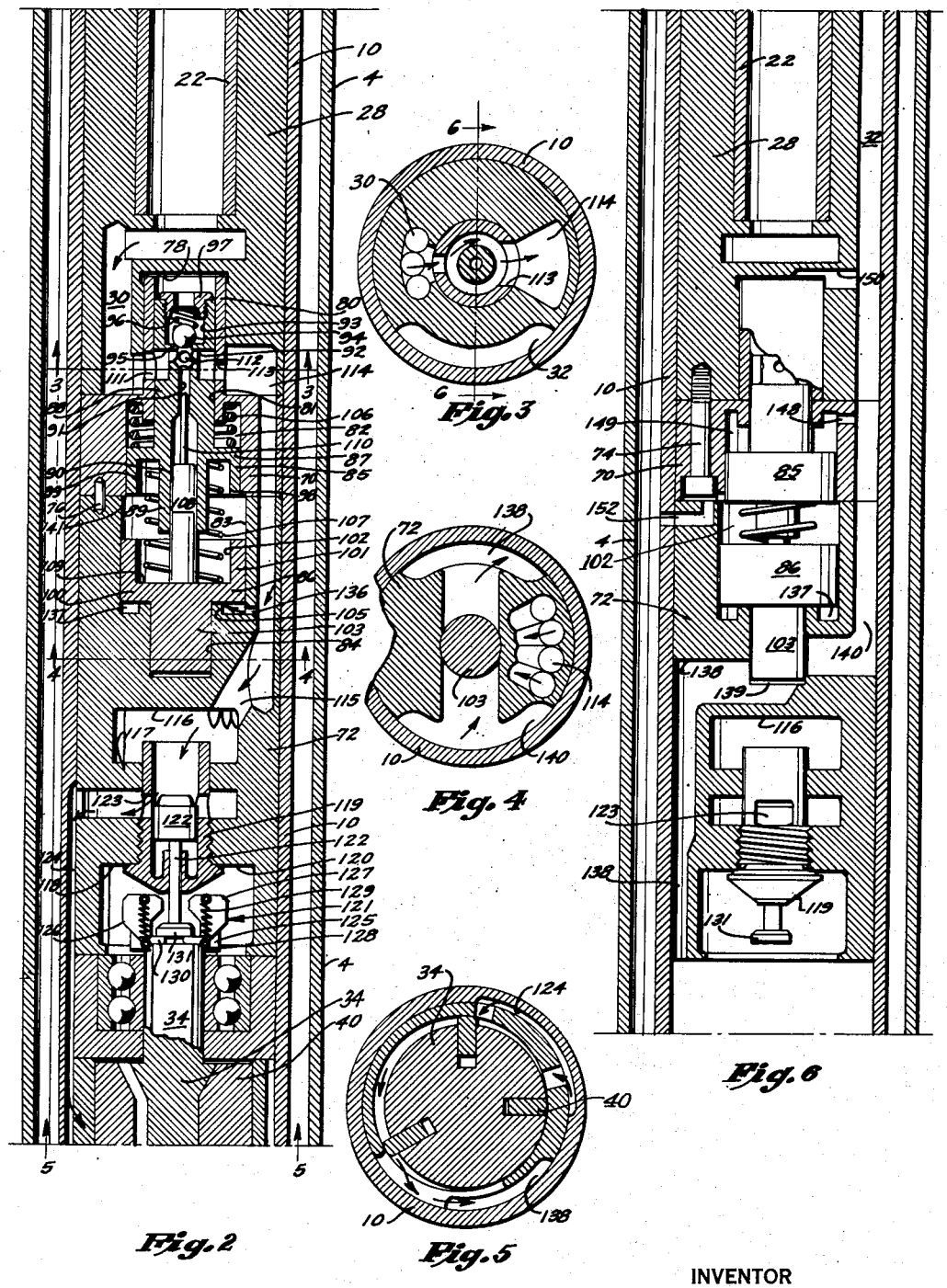
INVENTOR
*Harold R. Downs.*
BY *Barry & Cyr*
ATTORNEYS Jan. 6, 1942.  H. R. DOWNS  2,269,189
FLUID PUMP
Filed March 20, 1939  3 Sheets-Sheet 3

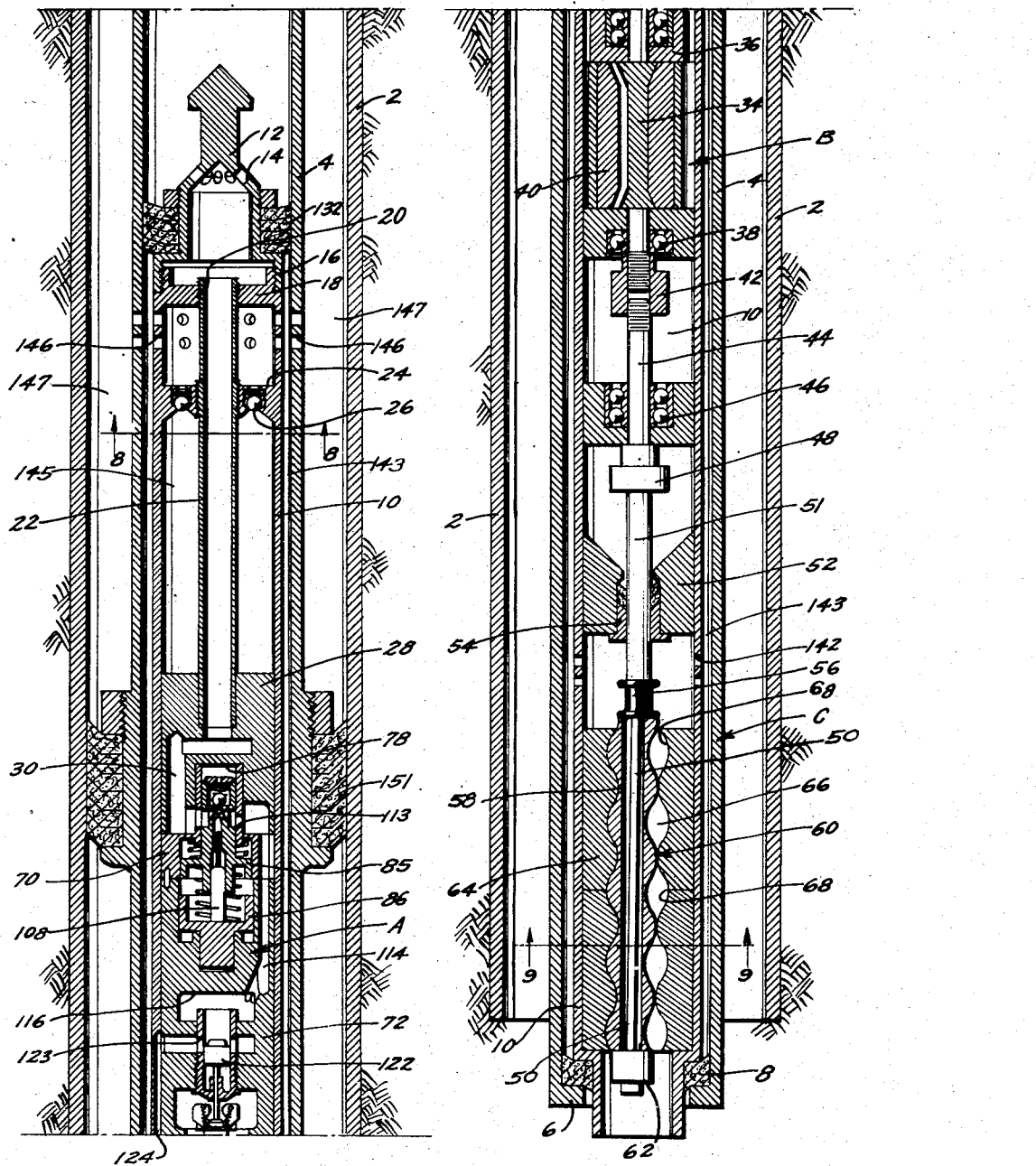

INVENTOR
Harold R. Downs
BY Barry & Cyr
ATTORNEYS

Patented Jan. 6, 1942

2,269,189

UNITED STATES PATENT OFFICE 2,269,189

FLUID PUMP

Harold R. Downs, Tulsa, Okla.

Application March 20, 1939, Serial No. 263,022

13 Claims. (Cl. 103—5)

This invention relates to a fluid operated deep well pump and more particularly, but not by way of limitation to a fluid operated pump utilizing a fluid pressure regulator for controlling the velocity of fluid to the fluid motor actuating the pump.

In the use of fluid operated pump mechanisms for oil wells and the like wherein the pump includes a fluid motor having a moving part for actuating the pump unit, some means must be provided for controlling the fluid supplied to the fluid motor, since the pump motor is subjected to varying load condition.

In the ordinary type of rotary actuated pumps utilizing a fluid such as gas or air for rotating a pump motor, the input fluid is relatively constant as to pressure, and when the discharging fluid from the motor is atmospheric, or some other known pressure to provide a constant pressure differential across the motor, then the speed of the pump motor can be regulated by a simple orifice, if the torque on the pump motor is constant, due to a definite speed of the flow of fluid (to compute volume) passing the orifice at the above mentioned constant pressure differential.

In bottom hole oil well pumps where there is a constant pressure differential across the pump motor, but a varying torque load, the speed of the motor can be maintained relatively constant by a centrifugal governor mounted by springs or the like, to cause the governor to control the speed of the motor according to the torque demand on the motor.

However in the present day pumping of oil wells with fluid pressure pump mechanisms, it has been found that the pump motor input pressure, the motor discharge pressure and the torque load demanded of the motor, seldom remain constant or even in substantially relative relationship to each other because of a constantly changing pump load. Another of the reasons for this is that the motor is hampered by the conventional cut off which introduces the input fluid into the motor cylinder, and only a certain percentage of the power stroke will close a valve allowing expansion of the trapped fluid to exert additional pressure against the motor piston or rotary vane. Fluid trapped in a motor chamber in this manner represents another problem in that it is never any constant pressure, but is dependent upon the input fluid pressure.

Furthermore, in a deep well pump which utilizes the discharge fluid pressure from the pump motor to aerate the column of oil being pumped it is necessary that the discharge pressure from the motor, in order to be injected into the column of oil must always be higher than the pressure of the column of oil. Consequently as this back pressure or load increases against the pump, the differential pressure across the motor is necessarily increased with the discharge pressure being injected into the flow line. Thus it will be seen that there is a constantly changing condition as to input fluid, discharge fluid from the motor, and exhaust head of the pump.

It is therefore an important object of this invention to provide a fluid pressure pump mechanism adapted to be actuated by a fluid motor so constructed and arranged wherein the motor cut off has been eliminated or reduced to the smallest possible degree within the limits of the clearances of the motor parts.

Another important object of this invention is to provide a fluid operated pumping mechanism for deep oil wells wherein discharge fluid from the pump motor is injected into the flow line from the pump mechanism to assist the pump in its pumping action.

And still a further object of this invention is to provide a fluid operated pumping mechanism for deep wells having means incorporated therewith to automatically maintain a fluid speed to a pump motor for maintaining a constant differential pressure for the motor regardless of any change in load on the motor.

An additional object of this invention is to provide a fluid operated pumping mechanism for deep oil wells having means incorporated therewith for controlling the velocity of fluid to the pump motor so that there is supplied only the amount of fluid necessary to actuate the motor at maximum capacity for a particular load condition of the pump, thus providing efficient and economic operation of the pump as well as economic use of the actuating fluid.

And still a further object of my invention is to provide a fluid operated pumping mechanism for deep wells having a fluid pressure regulator incorporated therewith adapted to be controlled simultaneously by the fluid input and discharge from the pump motor, to economically meter the necessary amount of fluid for maximum operation of the motor at any load condition.

Other objects and advantages of my invention will be evident from the following detailed description read in conjunction with the accompanying drawings which illustrate one form of my new invention.

In the drawings:

Fig. 1 is a vertical sectional view of the upper portion of my pump disposed in the tubing of a well hole, and showing the means for controlling the input fluid to the pump motor.

Fig. 1—A is a similar view of the lower portion of the improved pump mechanism disposed in a well hole showing the pump motor as well as the pump unit proper.

Fig. 2 is a vertical sectional elevational view showing in detail the control unit for the pump with the well casing omitted.

Fig. 3 is a view taken on lines 3—3 of Fig. 2.
Fig. 4 is a view taken on lines 4—4 of Fig. 2.
Fig. 5 is a view taken on lines 5—5 of Fig. 2.
Fig. 6 is a view similar to Fig. 2 taken on lines 6—6 of Fig. 3.

Figure 7:
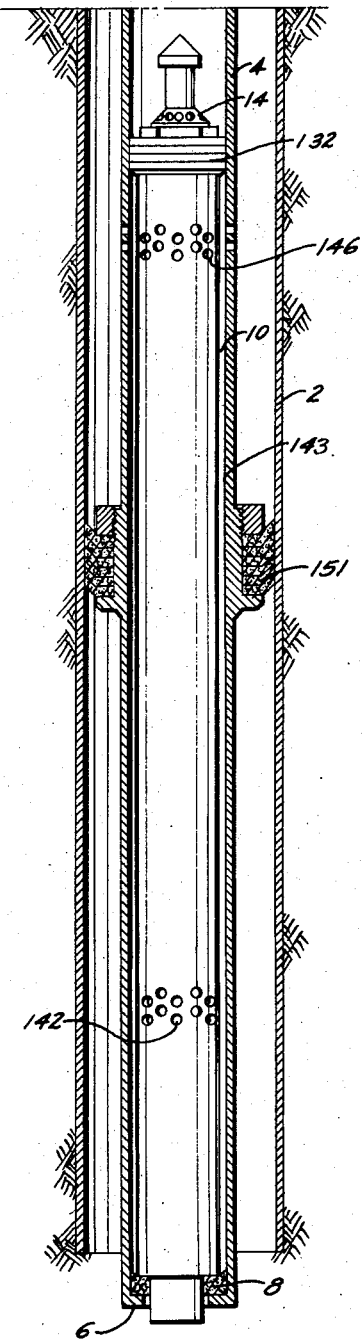
Fig. 7 is a vertical elevational view of the pump shown supported in the tubing of a well hole.
Figure 8:
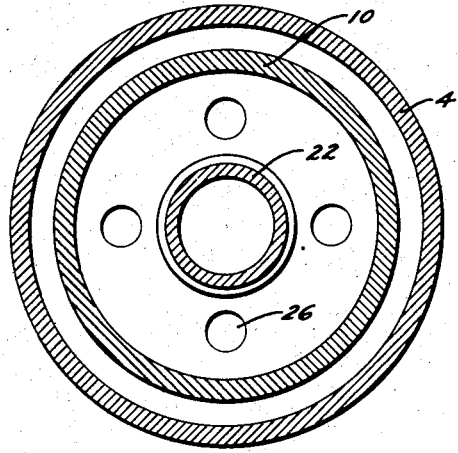
Fig. 8 is a view taken on lines 8—8 of Fig. 1.
Figure 9:
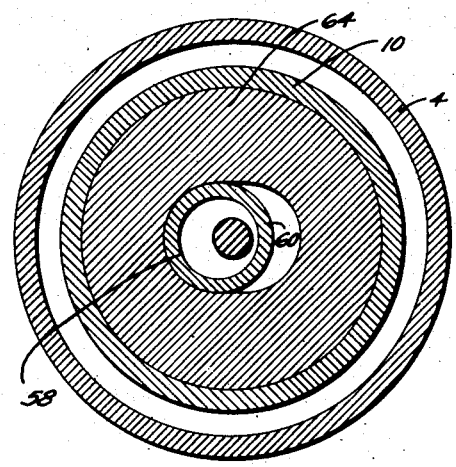
Fig. 9 is a view taken on lines 9—9 of Fig. 1—A.

Referring to the drawings in detail and more particularly Figs. 1 and 1—A, the pump mechanism is shown disposed in a well hole having a casing 2 and a string of tubing 4. The lowermost section of the tubing 4 is of special construction in that the inner periphery is formed with an annular projection 6 at the lowermost portion for receiving an annular ring or gasket 8 upon which the pump cylinder 10 is supported. The pump mechanism proper is contained within the cylinder 10 disposed within the tubing 4, and comprises three units, the control regulator A, the fluid motor B, and the pump unit proper C as will be hereinafter explained.

An anchor 12 having perforations 14 is threaded at 16 to a manifold 18 fixed within the cylinder 10. The manifold 18 is provided with a central threaded aperture 20 for receiving an inner cylinder 22 extending downwardly through a second manifold 24 fixed within the cylinder 10. The manifold 24 is also provided with a plurality of outlet check valves 26 as will be hereinafter set forth. The lower end of the cylinder 22 communicates with inlet ports 30 leading to the control unit A. A plurality of outlet ports 32 (Figs. 4 and 6) are provided in the manifold 28 for a purpose to be hereinafter set forth. The control unit A is disposed immediately below the manifold 28 and is shown in detail in Figs. 2 to 6 inclusive, and the detailed description will be hereinafter set forth.

A rotatable motor shaft 34 is journaled in suitable bearings 36 and 38 fixed within the cylinder 10 below the unit A. Referring to Figs. 1—A and 5 the motor shaft 34 is provided with a plurality of radially extending motor vanes 40 for a purpose as will be hereinafter set forth. The lower end of shaft 34 is connected to a threaded coupling 42, which also receives the upper end of a shaft 44 journaled in suitable roller bearings 46. The lower end of the shaft 44 is connected to a coupling 48. The upper end of a shaft 50 of smaller diameter is also secured in the coupling 48 by a ball joint connection (not shown), in alignment with the axis of the shaft 44. A housing 51 surrounds the shaft 50 and extends downwardly through an apertured mandrel 52 fixed within the cylinder 10 and containing suitable packing 54 surrounding the housing 51. The lower end of the housing 51 is provided with a rubber collar 56 through which the shaft 50 extends downwardly through an aperture 58 provided in a metal rotor 60 of the pump disposed between the collar 56 and a lower nut 62 threaded to the lower end of shaft 50. It will be understood that the shaft 50 is secured to the nut 62 by a ball connection (not shown) with the ball connection off center with respect to the axis of shaft 44. The ball connection for the lower end of shaft 50 is on center with the center of the aperture 58 of rotor 60 to provide rotation of the shaft 50 by the shaft 44 in such a manner that the rotor 60 will be rotated in an eccentric path with respect to the stator 64.

The elements of the pump unit C consist of the stator 64 preferably of metal or like material disposed within the cylinder 10. The stator 64 is provided with a bore 66 formed with a double threaded helix 68 in which the rotor 60 eccentrically rotates. The rotor 60 is formed with a single helix which meshes and turns in the double helix of the stator 64 to cause a positive endwise displacement of fluid from the oil pool, it being understood that fluid is displaced from one open helix to another open helix, when not in mesh with the rotor 60. This particular operation provides a sealed contact throughout the length of the pump unit without the use of valves. The pump unit C is of a construction similar to a patent granted to Moineau, No. 1,802,217, and the novelty of this invention is not limited to this particular structure, it being understood that any suitable type of rotary pump could be utilized in lieu of the particular construction shown.

With the pump mechanism supported by the annular projections 6 in the tubing 4, a supply of fluid such as gas or air from a source (not shown) is introduced into the tubing through the perforations 14 of the screen 12 and is allowed to flow through the cylinder 22 into the ports 30 into contact with the control unit A which will now be described in detail.

Disposed below the manifold 28 is an intermediate manifold 70 and a lower manifold 72, arranged in separate units in order to facilitate assembly and disassembly of the control unit A. The manifolds 28 and 70 are connected by bolts 74, while the manifolds 70 and 72 are connected by pins 76. A central recess 78 is provided in the lower part of manifold 28 and receives a sleeve 80 integral with and extending outwardly from the intermediate manifold 70.

The manifold 70 has a minor bore 81 in alignment with the inner periphery of the sleeve 80 and in communication with an enlarged major bore 82 provided in the manifold 70. The lower manifold 72 has a recess 83 of slightly larger diameter than the bore 82 and in communication therewith. The recess 83 is likewise in communication with a smaller recess 84 provided in the manifold 72. The construction of the manifolds 70 and 72 with the various recesses and the sleeve 80 is such to house a pair of floating pistons 85 and 86 of the control unit A. The upper piston 85 comprises a main annular body portion 87 having a centrally disposed boss extending from opposite sides of the body 87 comprising an upper boss 88 and a lower boss 89. A pair of communicating bores of varying diameters 90 and 91 are provided in the boss. The upper boss 88 has an intermediate portion of reduced diameter at 92 and is provided with a threaded recess 93 in the upper portion for receiving a ball valve 94 normally held against a seat 95 by a helical spring 96 anchored between the valve 94 and an apertured nut 97 threaded into the recess 93 for a purpose as will hereinafter be set forth.

An annular flange 98 is formed on the piston 85 in spaced relation to the boss 89 to provide a recess 99. The lower piston valve 86 is substantially T-shaped and disposed in the recesses 83 and 84 of the manifold 72. The cross portion 100 of the piston 86 is provided with an annular flange 101 forming a recess 102 in communication with the recess 83. A lower portion 103 of the piston 86 is disposed in the recess 84. It is to be noted that at the juncture of the recesses 83 and 84, the manifold 72 is provided with an annular flange or projection 105 for a purpose to be hereinafter set forth.

A helical spring 106 surrounds the upper boss 88, and is anchored in the major bore 82. A second helical spring 107 surrounds the lower boss 89 and is anchored in the recesses 83 and 102 between the pistons 85 and 86. A third piston 108 is disposed in the recess 90 having its lower end contacting the top portion 109 of the cross portion 100 for a purpose to be hereinafter set out. The top face of the piston 108 has an upstanding projection 110 of smaller diameter and adapted to be disposed in the recesses 90 and 91. The ports 30 of the manifold 28 are in communication with a port 111 provided in the sleeve 80 to allow supply fluid, such as gas or air to discharge through port 111 and around the reduced portion 92 of the boss 88. The reduced portion 92 of the upper boss is provided with a plurality of ports 112 in communication with the recesses 90 and 91. The sleeve 80 at a point diametrically opposite port 111, is provided with a second orifice or port 113.

The supply fluid discharges through port 111 into and around the reduced portion 92 through orifice 113 into conduits or ports 114 and 115 provided in manifolds 70 and 72 and communicating with a recess 116 provided in the lower manifold 72. The recess or chamber 116 comprises a pair of annular shouldered portions 117 and 118, with the shoulder 118 having threads for receiving a threaded sleeve 119. A recess or chamber 120 is provided below the recess 116 and has disposed therein a centrifugal type governor 121 adapted to cooperate with a slide valve 122 arranged within the sleeve 119. The sleeve 119 is provided with a port 123 providing communication between the recess 116 and a port 124 leading to the motor unit B.

The centrifugal governor 121 comprises a flanged member 125 integral with the rotating motor shaft 34 (Fig. 2). A pair of wing members 126 and 127 are fixed to the flange 125 by pivot pins 128. Each of the wing members are normally held in upright position by helical springs 129 anchored to the flange 125 and each of the wing members. The wing members are each provided with a normally horizontally disposed projection 130 adapted to contact the under face of the lower portion 131 of the valve 122 for a purpose as will be hereinafter set forth.

*Operation*

In operation a source of motivating fluid such as air or gas, is directed from a source of supply such as a compressor at the surface of a well (not shown), into the tubing 4, and is discharged through the perforations 14 into the cylinder 22 and port 30. Suitable packing 132 is disposed within the tubing 4 and surrounds the screen 12 for a purpose as will be hereinafter set forth. In the use of a pump mechanism in a deep oil well, obviously a great amount of pipe or tubing 4 will be utilized, creating a large volume of space through which to direct the fluid. When the motivating fluid enters the tubing 4 the volume created by the large amount of tubing must be overcome, consequently the fluid pressure rises from atmospheric in the pipe until the volume is overcome to equal the same pressure as that of the source of fluid supply throughout the whole length of the tubing string wherein the pump mechanism can be actuated.

From the port 30 the supply fluid discharges through the port 111 around the reduced portion 92, through orifice 113 and into the ports 114 and 115, chamber 116, orifice 123 and into the port 124 leading to the motor unit B. From an inspection of Fig. 5 it will be noted that input fluid from port 124 contacts the motor vanes 40 to cause rotation of the motor unit B at a velocity substantially equal to the velocity of the input fluid as determined by the orifice 113. By input fluid pressure as distinguished from the supply fluid pressure in port 30 is meant the fluid pressure existing in port 114 communicating with the motor B. At this point it is to be noted that the manifold 72 is provided with a port 136 providing communication between port 114 and a chamber 137 whereby input fluid pressure will be discharged below the piston 86.

The pressure of the input fluid entering chamber 137 will effect a movement of the piston valve 86 upwardly. However, it will be apparent that input fluid passing through port 111 also flows through the ports 112 into the recesses 91 and 90 where it contacts the piston 108, which in conjunction with the springs 106 and 107 oppose the upward movement of piston 86. The respective areas of pistons 85 and 86 as well as piston 108 cooperating with the pressure acting thereagainst create a static pressure condition within the chamber 137 for a purpose as will be hereinafter set forth.

With input fluid entering the motor unit B to cause actuation thereof, the discharge fluid pressure from the motor discharges into port 138 (Fig. 6) provided in the manifold 72, and arranged at substantially 90 degrees to the inlet conduit 114 (see Fig. 4). The discharge fluid pressure in conduit 138 contacts the lower face 139 of portion 103 to assist the movement of the piston valve 86 upwardly. Upward movement of the piston 86 allows the discharge fluid to enter outlet ports 140 and 32 provided in the manifolds 72 and 70 respectively. It will be understood that the inlet ports 30 and 114 are blocked off from the outlet ports 138 and 140. The action of the inlet fluid pressure in chamber 137 in conjunction with the discharge fluid pressure in condit 138 causes movement of the piston valve 86 upwardly due to its larger area cooperating with the fluid pressures to overcome the action of springs 106 and 107 and the input pressure reacting against the pistons 85 and 108. It will be apparent that when the tension of the spring 106 is overcome, continued upward movement of the piston valve 86 would likewise cause upward movement of the piston valve 85, tending to close off the orifice 113 by the upper boss 88. However, the vertical upward movement is limited by the top face of flange 101 contacting the lower face 141 of manifold 70 and the control unit is so constructed and arranged with its respective areas and pressures in fixed relation to each other that the orifice 113 will not be completely closed off but will meter input fluid at such a velocity to provide sufficient volume for maximum operation of the motor unit B at any load condition of the pump.

It will be apparent that the supply fluid in port 30 may be maintained at a pressure of such magnitude to operate the motor under most working conditions. The fluid volume required to operate the motor at maximum power and speed is dependent upon the supply pressure, as well as the fluid velocity through the orifice 113, said volume providing a certain fluid input pressure in port 114 as distinguished from the fluid supply pressure in port 30. At no load of the motor a sufficient volume for the motor can be maintained with a slight opening of orifice 113 due to the high supply pressure cooperating with the areas of the pistons and their cooperating springs. However, any increase in back pressure on the pump to increase the load on the motor would decrease the speed of the motor, unless the fluid velocity is regulated by opening the orifice 113 relative to the fluid supply pressure to maintain the necessary volume for maximum operation of the motor. With an increase in input pressure at load conditions, there is a simultaneous increase in discharge pressure from the motor to provide a constant differential pressure across the motor commensurate with the constant volume of fluid to the motor.

It will be apparent that the input pressure and the discharge pressure actuate the control unit A to economically meter through the orifice 113 a predetermined amount of fluid at a speed necessary to maintain a differential on the motor unit B, depending on the load. With the rotation of the motor shaft 34 there is a simultaneous rotation of the shafts 44, 50 and rotor 60. As previously stated rotation of the rotor 60, in the stator 64 displaces fluid in the oil pool through the pump unit where it is allowed to be discharged through ports 142 into a space 143 between the tubing 4 and the pump cylinder 10. There is a constant increase in column load of oil, and with the motor discharge pressure utilized to help aerate the column load, obviously the discharge pressure must be higher than the back pressure load. Consequently to maintain the necessary volume and pressure differential between the input and discharge fluid pressures of the motor, the orifice opening 113 must be regulated accordingly. The discharge motor fluid pressure discharging into outlet conduit 138 is of greater magnitude and velocity than the back pressure of the pumping load present in the space 143, consequently the discharge motor fluid can be discharged through ports 140 and 32 communicating directly with a chamber 145 between manifolds 24 and 28, through the check valves 26 and outlet port 146 into a space 147 between the tubing 4 and the casing 2. It will be understood that the packing 132 packs off the motor discharge fluid pressure and the oil in space 143 from the input fluid. The lower section of tubing 4 is provided with suitable packing 151 to pack off the oil being pumped from the oil pool.

As previously mentioned the motor discharge fluid pressure can be utilized to assist the input fluid in controlling the orifice opening 113. This is done by allowing motor discharge fluid in port 140 to be discharged through a port 148 (Fig. 6) into a chamber 149 above the piston 85. Furthermore, the motor discharge fluid is allowed to enter a port 150 leading into the recess 78 at a point above the upper boss 88. It will thus be seen that the motor discharge pressure in addition to assisting upward movement of the piston valves 85 and 86, also oppose this movement by acting against the upper piston valve 85. Although the springs 106 and 107 are primarily for smoothing out the movement of the pistons, the spring 106 is of greater strength than spring 107 and likewise assists in opposing the upward movement of the piston valve 85.

In order to compensate for any unusual increase in pump load, the oil pumped into chamber 143 is by-passed through a port 152 into recess 102 above the piston 86, so that the oil back pressure assists the input and discharge motor pressures in regulating the orifice 113 whereby the magnitude and speed of the motor discharge pressure can be maintained slightly higher than any increased load condition of the pump without any loss of inertia.

If a gas pocket or similar condition is present in the well, the motor load would be suddenly decreased to cause undue racing and consequent damage to the working parts of the motor. The centrifugal governor 121 mentioned, supra, provided in the control unit A, prevents any undue racing of the motor unit B due to a decreased load condition. With any abnormal rotation of the motor shaft 34, the wing members 126 and 127, due to centrifugal force are caused to be moved outwardly against the action of the springs 155. In the outward movement of the wing members, the projections 130 have a lifting action against the lower portion 131 of the valve 122, wherein the valve is moved upwardlly to close off the port 123 supplying input fluid to the motor unit B. It will be understood that the valve will block the port 123 until the velocity of the motor has been decreased wherein the wing members will assume their normal position and allow the port 123 to be opened. The centrifugal governor has no function whatsoever with the control unit A, but only operates when the motor shaft 34 rotates at an excessive speed.

With the back pressure load for the pump constantly increasing it has been found that under certain conditions the back pressure is increased to where it is equivalent or higher than the discharge pressure from the motor unit B. In such condition the input pressure will continue the actuation of the motor, but continued increase of the back pressure will cause a decrease of the differential pressure across the motor to decrease the speed of the motor. Obviously a higher differential of pressure must be maintained for maximum operation of the motor at the torque demanded.

The ball valve 94 acting as a flow intermitter functions to relieve any substantial increase in back pressure by by-passing the supply fluid for slugging the column of oil in order to lift it upwardly in the space 147. When this condition exists, abnormal pressures are acting against the pistons 85 and 86 forcing the pistons toward each other. With the pistons assuming this position, the projection 110 of piston 108 will be so disposed in the recess 91 to contact the ball valve 94 and unseat it from seat 95, and allow supply fluid flowing through port 111 to flow through the valve opening. With a flow of supply fluid around the ball valve 94, and through the apertured nut 97 into port 150 communicating with port 32 where the supply fluid is discharged through port 32 into space 145, through the ports 146 to be discharged into the oil space 147, thereby slugging or lifting the oil load upwardly with a consequent decrease of back pressure so as to re-establish the required differential across the motor unit B.

From the foregoing it will be apparent that this invention provides a control for a fluid motor which entirely eliminates motor cut off. However, it will be understood that the control can be designed to operate on a motor for any known cut off. Furthermore, the invention provides a control for a pump motor dependent upon various pressures cooperating with the areas in the control unit wherein the constant motor supply pressure in the inlet cylinder 22 is the highest pressure, and the discharge pressure from the motor is lower than the supply pressure to the motor B, due to the power taken out by the motor unit B in producing the torque for rotating the rotor 60. Yet the motor discharge pressure is of greater magnitude and velocity than the back pressure from the pump, whereby all pressures simultaneously cooperate in fixed relation to the areas of the pistons 85, 86 and 108 to automatically position the orifice 113, wherein the speed of the motor supply fluid can be regulated to provide a constant volume and differential pressure across the motor unit B to operate the motor at maximum power and speed regardless of whatever torque is demanded by the motor shaft 34, dependent upon the particular pumping load of the pump unit C.

Changes may be made in the combination and arrangement of parts as heretofore set forth in the specification and shown in the drawings, it being understood that any modification in the precise embodiment of the invention may be made within the scope of the following claims without departing from the spirit of the invention.

What I claim is:

1. In a fluid pump mechanism, a fluid driven motor, a fluid supply line for said motor, a fluid regulator in said supply line, a pump unit driven by the motor, means providing fluid communication between the regulator and the motor, said regulator comprising means movable in response to motor supply fluid pressure to meter fluid through the first mentioned means, and means diverting discharge fluid pressure from the motor and cooperating with the last mentioned means to control the movement of the last mentioned means.

2. In a fluid pump mechanism, a fluid driven motor, a fluid supply line for said motor, a fluid regulator in said supply line, a pump unit driven by the motor, means providing fluid communication between the regulator and the motor, said regulator comprising means movable in response to motor supply fluid pressure to meter fluid through the first mentioned means, means diverting discharge fluid pressure from the motor to said last mentioned means so that the discharge fluid pressure cooperates to control the movement of the last mentioned means to maintain a differential fluid pressure across the motor sufficient for efficient operation of the motor regardless of the torque of the pump.

3. In a fluid actuated pump mechanism for deep wells comprising a cylinder, a fluid motor and a pump driven thereby disposed in the cylinder, a fluid regulator disposed in the cylinder above the motor, said regulator comprising a plurality of manifolds, a plurality of cooperating pistons disposed in the manifolds, means provided in the manifolds for introducing supply fluid to the motor, one of said pistons movable in response to motor supply fluid pressure to meter fluid through the inlet means, and means for diverting discharge fluid pressure from the motor against the cooperating pistons for controlling the movement of the first mentioned piston with respect to the inlet means.

4. In a fluid actuated pump mechanism for deep wells comprising a cylinder, a fluid motor and a pump driven thereby disposed in the cylinder, a fluid regulator disposed in the cylinder above the motor, said regulator comprising a plurality of manifolds, a plurality of cooperating pistons disposed in the manifolds, means provided in the manifolds for introducing supply fluid to the motor, one of said pistons movable in response to motor supply fluid pressure to meter fluid through the inlet means, means for diverting discharge fluid pressure from the motor against the cooperating pistons for controlling the movement of the first mentioned piston with respect to the inlet means, and means cooperating with the motor for automatically restricting the flow of fluid to the motor upon any abnormal racing of the motor.

5. In a fluid actuated pump mechanism for deep wells comprising a cylinder, a fluid motor and a rotary pump unit driven thereby disposed in the cylinder, a fluid regulator disposed in the cylinder above the motor, said regulator comprising a plurality of manifolds, a plurality of cooperating pistons disposed in the manifolds, a plurality of communicating ports in the manifolds for introducing supply fluid to the motor, an orifice cooperating with the ports, one of said pistons movable in response to motor supply fluid pressure to meter fluid thruogh the orifice to the motor, and means for diverting discharge fluid pressure from the motor against each of the pistons for controlling the movement of the first mentioned piston with respect to the orifice.

6. In a fluid actuated pump mechanism for deep wells comprising a cylinder, a fluid motor and a rotary pump unit driven thereby disposed in the cylinder, a fluid regulator disposed in the cylinder above the motor, said regulator comprising a plurality of pistons, an orifice, one of said pistons movable in response to motor supply fluid pressure to meter fluid through the orifice to the motor, and means for diverting discharge fluid pressure from the motor against each of the pistons for automatically controlling the movement of the first mentioned piston with respect to the orifice in order to maintain a constant differential pressure across the motor.

7. In combination with the tubing of a well hole, a pump mechanism comprising a cylinder having disposed therein a fluid motor and a rotary pump driven thereby, said cylinder disposed in the tubing in spaced relation thereto to provide a chamber for pumped fluid, a fluid regulator disposed in the cylinder above the motor, said regulator so constructed and arranged to automatically meter supply fluid to the motor at a velocity necessary to actuate the motor regardless of the load condition of the pump, and means in the cylinder providing communication between the chamber and the fluid regulator whereby fluid from the supply pump is directed to the regulator for assisting the operation thereof.

8. In combination with the tubing of a well hole, a pump mechanism comprising a cylinder having disposed therein a fluid motor and a pump driven thereby, said cylinder disposed in the tubing in spaced relation thereto to provide a chamber for pumped fluid, a fluid regulator disposed in the cylinder above the motor, said regulator comprising a plurality of axially disposed cooperating pistons, a port providing communication between the regulator and the motor for introducing supply fluid to the motor, one of said pistons movable in response to motor supply fluid pressure to meter motor supply fluid into the port, means for diverting discharge fluid pressure from the motor against each of the pistons for automatically controlling the movement of the first mentioned piston with respect to the port, and spring means surrounding at least one of said pistons and cooperating with the motor supply and discharge pressures to assist the control of the first mentioned piston.

9. In combination with the tubing of a well hole, a pump mechanism comprising a cylinder having disposed therein a fluid motor and a pump driven thereby, said cylinder disposed in the tubing in spaced relation thereto to provide a chamber for pumped fluid, a fluid regulator disposed in the cylinder above the motor, said regulator comprising a plurality of axially disposed cooperating pistons, a port providing communication between the regulator and the motor for introducing supply fluid to the motor, one of said pistons movable in response to motor supply fluid pressure to meter motor supply fluid through the port, means for diverting discharge fluid pressure from the motor against each of the pistons for automatically controlling the movement of the first mentioned piston with respect to the port, spring means surrounding one of said pistons and cooperating with the motor supply and discharge pressures to assist the control of the first mentioned piston, and means cooperating with the motor for restricting the flow of fluid to the motor upon any abnormal racing thereof.

10. In combination with the tubing of a well hole providing a fluid pressure inlet, a pump mechanism comprising a cylinder having disposed therein a fluid motor and a rotary pump driven thereby, said cylinder disposed in the tubing in spaced relation thereto to provide a chamber for pumped fluid, means in the tubing for packing off the motor supply fluid from the chamber, a fluid regulator disposed in the cylinder above the motor, said regulator comprising a plurality of cooperating pistons, a port providing communication between the regulator and the motor for introducing supply fluid to the motor, one of said pistons movable in response to motor supply fluid pressure to meter motor supply fluid into the port, means for introducing motor input fluid pressure to the other of said pistons, means for diverting discharge fluid pressure from the motor against each of the pistons for automatically controlling the movement of the first mentioned piston with respect to the port, and means in the cylinder providing communication between the chamber and the fluid regulator to introduce fluid from the pump to assist the input and discharge fluid pressures of the motor in controlling the movement of the first mentioned piston.

11. In combination with the tubing of a well hole, a pump mechanism comprising a cylinder disposed in the tubing in spaced relation thereto to provide a chamber for fluid to be pumped, a fluid motor and a pump driven thereby disposed in the cylinder, a fluid regulator disposed in the cylinder above the motor, said regulator comprising a plurality of axially disposed cooperating pistons providing an upper and lower piston, a port providing communication between the regulator and the motor, said upper piston movable in response to motor supply fluid pressure to meter motor supply fluid into the port to the motor, an intermediate piston disposed between the upper and lower pistons, a plurality of ports in the upper piston, a recess in the upper piston communicating with the last named ports for introducing motor supply fluid into contact with the intermediate piston, means for diverting discharge fluid pressure from the motor against the upper and lower pistons for automatically controlling the movement of the upper piston with respect to the port, and means in the cylinder providing communication between the chamber and the pistons to introduce pressure fluid from the pump to assist the input and discharge fluid pressures of the motor in controlling the movement of the upper piston.

12. In combination with the tubing of a well hole, a pump mechanism comprising a cylinder disposed in the tubing in spaced relation thereto to provide a chamber for pumped fluid, a fluid motor and a pump driven thereby disposed in the cylinder, a fluid regulator disposed in the cylinder above the motor, said regulator comprising a plurality of axially disposed cooperating pistons providing an upper and lower piston, a port providing communication between the regulator and the motor, said upper piston movable in response to motor supply fluid pressure to meter fluid into the port to the motor, an intermediate piston disposed between the upper and lower pistons, a plurality of ports in the upper piston, a bore in the upper piston communicating with the last named ports for introducing motor supply fluid into contact with the intermediate piston, means for diverting discharge fluid pressure from the motor against the upper and lower pistons for automatically controlling the movement of the upper piston with respect to the port, means in the cylinder providing communication between the chamber and the pistons to introduce pressure fluid from the pump to assist the inlet and discharge fluid pressures of the motor in controlling the movement of the upper piston, a valve disposed in the upper piston, means providing communication between the valve and the pump discharge line, and means adapted to open the valve to by-pass motor supply fluid into the pump discharge line.

13. In a fluid pump mechanism, a fluid driven motor, a fluid supply line for said motor, a fluid regulator in said supply line, a pump unit driven by the motor for pumping liquid, means providing fluid communication between the regulator and the motor, said regulator comprising means movable in response to motor supply fluid pressure to meter fluid through the first mentioned means, means diverting discharge fluid pressure from the motor to said last mentioned means so that said discharge fluid cooperates to control the movement of the last mentioned means, and means simultaneously introducing discharge fluid pressure of the motor into the pumped fluid to assist the work of the pump.

HAROLD R. DOWNS.